(12) United States Patent
Hayashi et al.

(10) Patent No.: US 8,299,407 B2
(45) Date of Patent: Oct. 30, 2012

(54) ELECTROMAGNETIC INDUCTION HEATING DEVICE

(75) Inventors: Takakazu Hayashi, Yao (JP); Sizunao Hattori, Yao (JP)

(73) Assignees: Wakoh Denken Kabushiki Kaisha, Osaka (JP); Hoshizaki Denki Kabushiki Kaisha, Aichi (JP)

( * ) Notice: Subject to any disclaimer, the term of this patent is extended or adjusted under 35 U.S.C. 154(b) by 223 days.

(21) Appl. No.: 12/735,158

(22) PCT Filed: Nov. 7, 2008

(86) PCT No.: PCT/JP2008/070353
§ 371 (c)(1),
(2), (4) Date: Jun. 18, 2010

(87) PCT Pub. No.: WO2009/084328
PCT Pub. Date: Sep. 7, 2009

(65) Prior Publication Data
US 2010/0258556 A1 Oct. 14, 2010

(30) Foreign Application Priority Data

Dec. 27, 2007 (JP) ................................. 2007-336996

(51) Int. Cl.
*H05B 6/14* (2006.01)

(52) U.S. Cl. ........................................ 219/619; 219/676
(58) Field of Classification Search .................. 219/619, 219/624, 626, 661, 662, 676
See application file for complete search history.

(56) References Cited

U.S. PATENT DOCUMENTS 7,105,783 B2 * 9/2006 Takagi et al. ................. 219/619

FOREIGN PATENT DOCUMENTS

| JP | S62-119892 | 6/1987 |
| JP | S63-55882 | 3/1988 |
| JP | H4-231918 | 8/1992 |
| JP | 2000-91063 | 3/2000 |
| JP | 2007-257977 | 10/2007 |

* cited by examiner

*Primary Examiner* — Quoc Hoang
(74) *Attorney, Agent, or Firm* — DLA Piper LLP (US)

(57) ABSTRACT

Provided is a low cost and highly safe electromagnetic induction heating device capable of uniformly heating an object to be heated. A work coil (26) has a basic coil (28) located at the innermost position, a first coil (30) located at the intermediate position, and a second coil (32) located at the outermost position, the latter two coils being connected in series to the basic coil (28). The first coil (30) and the second coil (32) are connected in parallel to each other. A switching circuit (16) for supplying a high-frequency current is connected to the first coil 30, and a second switching circuit 18 for supplying a high-frequency current is connected to the second coil 32.

5 Claims, 2 Drawing Sheets

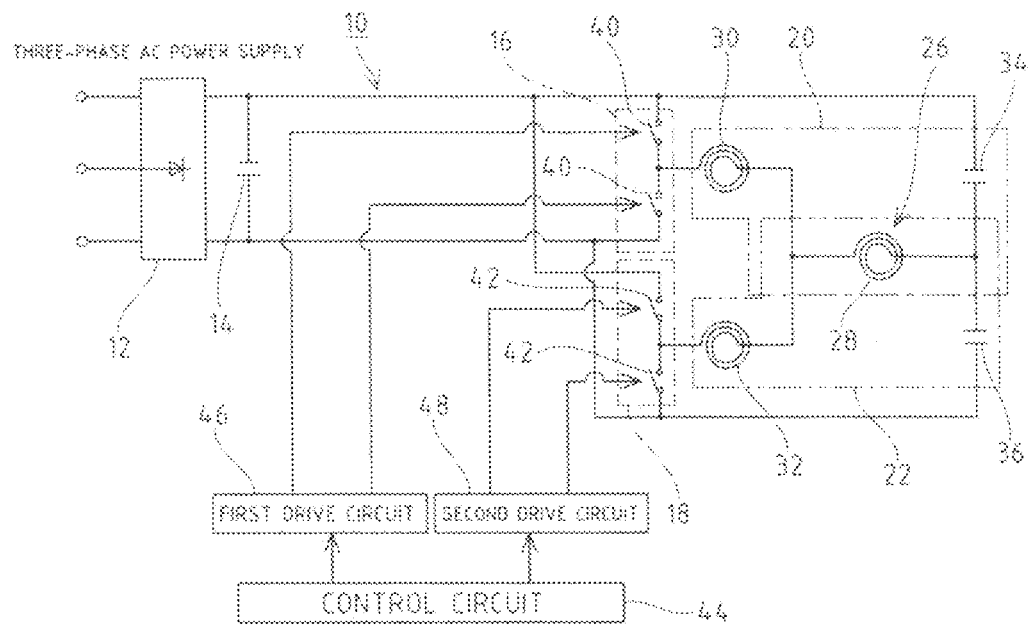
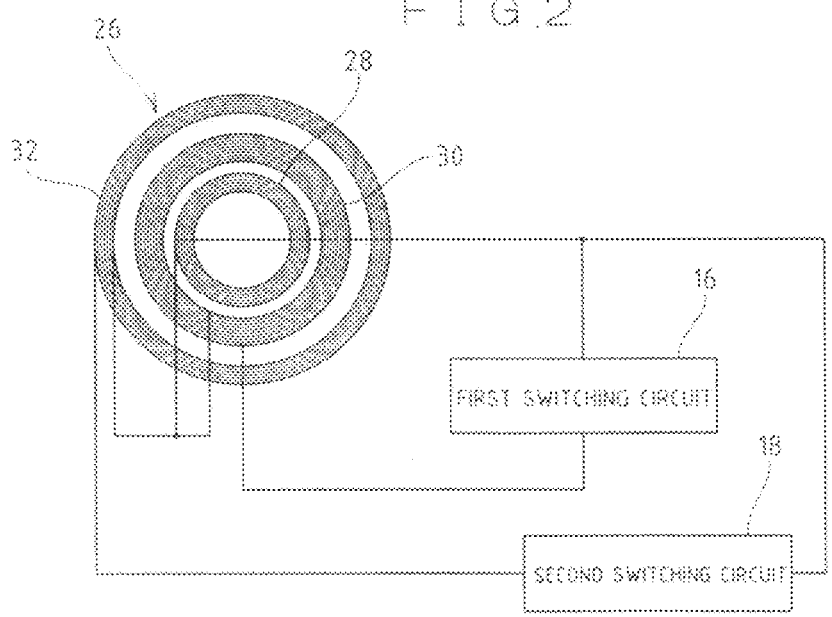

ELECTROMAGNETIC INDUCTION HEATING DEVICE

TECHNICAL FIELD

The present invention relates to an electromagnetic induction heating device which heats an object to be heated using electromagnetic induction.

BACKGROUND ART

An electromagnetic range using a work coil (induction heating coil) which generates an induced current (eddy current) in an object to be heated, such as a pan made of a metal, is known as an electromagnetic induction heating device. This electromagnetic range is configured so as to supply a high-frequency current of 20 kHz or higher to one spiral work coil located under the top plate, thereby generating a magnetic flux may occur in the work coil. As the object to be heated placed on the top plate is magnetically coupled to the magnetic flux in the work coil, an induced current flows into the object to be heated, which is heated with the Joule heat produced by the induced current.

In the electromagnetic range using a single work coil, the magnetic flux generated in the work coil becomes maximum near the center in the radial direction of the work coil. Therefore, the temperature of the object to be heated at the bottom thereof becomes high near the center in the radial direction of the work coil, and becomes low at the other locations to have a heating distribution of a doughnut shape, causing uneven heating.

In this respect, there has been proposed an electromagnetic range that is configured to have a work coil divided into a plurality of heating coils, which are arranged concentrically on the same plane, and are driven by respective high-frequency power generation circuits, thus making the heating distribution of the object to be heated uniform to achieve uniform heating (for example, refer to Patent Literature 1).

Patent Literature 1: Japanese Unexamined Patent Publication No. 2007-257977

DISCLOSURE OF THE INVENTION

Problems to be Solved by the Invention

Objects to be heated, such as pans to be used in cooking, may be made of various materials and sizes, and such an object to be heated should not necessarily be placed in the center of the work coil. According to an electromagnetic range provided with a plurality of independent heating coils as disclosed in the Patent Literature 1, therefore, when an object to be heated is not magnetically coupled to the magnetic flux generated in the heating coil during cooking, the heating coil is driven loadlessly. This causes an excess current to flow into the switching element which constitutes the respective high-frequency power generation circuit, causing a failure. It is therefore necessary to always monitor the position of an object to be heated during cooking, and perform control to promptly stop supplying electric power when the heating coil becomes a loadless state. That is, in case of using a plurality of divided heating coils, detection means to monitor the position of an object to be heated with respect to each coil needs to be provided for every coil, which brings about problems of complicating the circuit and increasing the cost. In addition, the detection result for each coil should be judged, which demands the control system of faster processing, thus increasing the burden of the control system.

Further, the electromagnetic range of Patent Literature 1 requires a high-frequency power generation circuit (switching element) for each of the divided heating coils, bringing about the problem that the cost increases as the number of parts increases. Moreover, due to a subtle variation in internal resistance originated from a productional error in the switching elements which constitute the high-frequency power generation circuits, it is not guaranteed that the current is uniformly distributed to the heating coils via the respective switching elements. It is therefore necessary to use switching elements of high rated current and high rated voltage in anticipation of the safety factor, from which it is pointed out that the cost is further increased and the ratio of occurrence of failures becomes higher.

Accordingly, the invention is proposed to overcome the inherent problems of the related art, and it is an object of the invention to provide a low cost and highly safe electromagnetic induction heating device which can uniformly heat an object to be heated.

Effect the Invention

The electromagnetic induction heating device according to the invention can uniformly heat an object to be heated, can suppress the cost low, and can secure high safety.

BRIEF DESCRIPTION OF THE DRAWINGS

FIG. 1 A control circuit diagram of an electromagnetic range according to an embodiment.

FIG. 2 An explanatory diagram showing the relation between the work coil and switching circuit of the electromagnetic range according to the embodiment.

BEST MODE OF CARRYING OUT THE INVENTION

Figure 3:
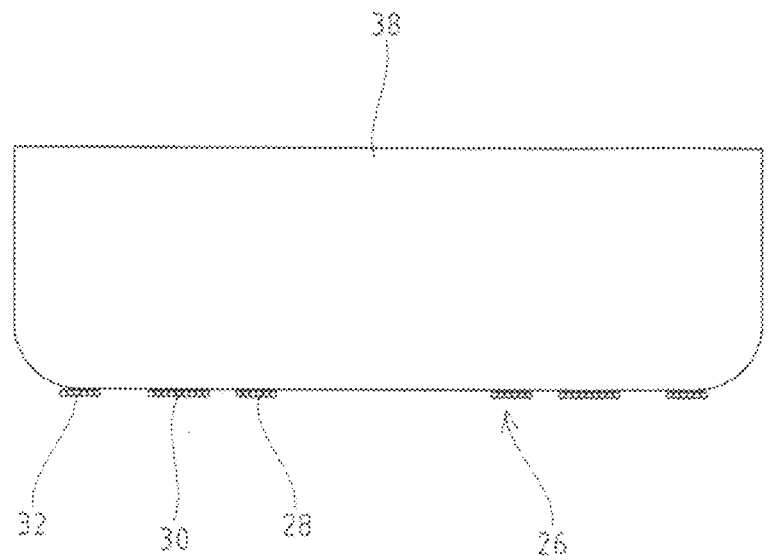
FIG. 3 An explanatory diagram showing a state where an object to be heated is magnetically coupled to all the coils which constitute the work coil according to the embodiment.

Next, an electromagnetic induction heating device according to the invention will be described by way of a preferred embodiment with reference to the accompanying drawings.

Embodiment

FIG. 1 shows a circuit diagram of an electromagnetic range as an embodiment of the electromagnetic induction heating device. An electromagnetic range 10 basically includes a rectifier 12 which rectifies and converts the output of a three-phase AC power supply (for example, 200 V) into a DC voltage, a smoothing capacitor 14 which smoothes the DC voltage rectified by the rectifier 12, resonant circuits 20 and 22 which have coils 28, 30, 32 for heating an object 38 to be heated, and switching circuits 16 and 18.

The resonant circuit of the electromagnetic range 10 comprises a work coil (heating induction coil) and a resonant capacitor, and a work coil 26 has three or more (three in the embodiment) coils 28, 30, and 32 arranged substantially concentric on a substantially same plane in the embodiment. Each of the first coil (first coil) 30 located at an intermediate position, and the second coil (the first coil) 32 located at the outermost position is connected in series to the basic coil (second coil) 28 located at the innermost position, and the first coil 30 and the second coil 32 are connected in parallel (refer to FIG. 1). The two resonant capacitors 34 and 36 are connected to the basic coil 28 in series. The basic coil 28, and the first coil 30 and the first resonant capacitor 34 which are connected in series to the basic coil 28 constitute the first resonant circuit 20. Further, the basic coil 28, and the second coil 32 and the second resonant capacitor 36 which are connected in series to the basic coil 28 constitute the second resonant circuit 22. That is, the resonant circuit is divided into the same number of resonant circuits as the number of the coils 30, 32 according to the embodiment. The work coil 26 is arranged under an unillustrated nonconductive top plate, so that the to-be-heated object 38, such as a pan, which is placed on the top plate to be magnetically coupled, is heated by electromagnetic induction.

Each of the coils 28, 30, and 32 is formed by spirally winging a litz wire which has multiple insulated strands twisted; all the winding directions are set to the same direction (clockwise winding or counterclockwise winding). The number of the strands of the litz wire of the basic coil 28 is set greater than the numbers of the strands of the first coil 30 and the second coil 32 (for example, it is set double, but may be set to a value which can control a temperature rise according to the flowing current).

The electromagnetic range 10 has the two switching circuits 16 and 18. The first switching circuit 16 includes a pair of first switching elements 40, 40 connected to the smoothing capacitor 14, and is connected to the first coil 30 which constitutes the first resonant circuit 20. The other, second switching circuit 18 includes a pair of second switching elements 42, 42 connected to the smoothing capacitor 14, and is connected to the second coil 32 which constitutes the second resonant circuit 22. The first switching elements 40, 40, and the second switching elements 42, 42 are connected in parallel to the smoothing capacitor 14. When the pair of first switching elements 40, 40 is turned on/off alternately, the first switching circuit 16 generates a high-frequency current from the DC voltage, and supplies it to the first resonant circuit 20. When the pair of second switching elements 42, 42 is turned on/off alternately, the second switching circuit 18 generates a high-frequency current from the DC voltage, and supplies it to the second resonant circuit 22. As the switching elements 40, 42, an MOSFET, MOSIC, IGBT, etc. are used favorably.

A first drive circuit 46 which controls the first switching circuit 16 and a second drive circuit 48 which controls the second switching circuit 18 are connected to a control circuit 44 of the electromagnetic range 10.

The ratio of the inductances of the basic coil 28 and the first coil 30 and the ratio of the inductances of the basic coil 28 and the second coil 32 are both set in the range of 1:3 to 1:4. When the ratio of the inductance of the basic coil 28 to the inductance of the other coil (first coil) 30, 32 is smaller than the ratio 1:4, the optimal adjustment of the load balance between the first switching circuit 16 and the second switching circuit 18, which will be discussed later, is no longer carried out. When the ratio of the inductance of the basic coil 28 to the inductance of the other coil 30, 32 is larger than the ratio 1:3, on the other hand, the wire length (the number of turns) of the basic coil 28 which has a greater number of the strands of the litz wire than that of the other coil 30, 32 becomes longer than needed, thus increasing the material cost which is not economical.

The difference between the first total inductance of the basic coil 28 and the first coil 30, and the second total inductance of the basic coil 28 and the second coil 32 is set to lie within 20%. This makes it possible to switch the first switching circuit 16 and the second switching circuit 18 at the same timing, so that the high-frequency currents of the same frequency are supplied to the individual coils 28, 30, 32, thereby suppressing occurrence of noise and vibration (pan noise) originated from the difference in frequency. Although the difference between the first total inductance and the second total inductance should lie within 20%, it is most favorable to set the total inductances equal to each other.

[Operation of Embodiment]

Next, the operation of the electromagnetic range according to the embodiment will be described.

The output from the three-phase AC power supply is rectified to be converted into a DC voltage by the rectifier 12, and is then smoothed by the smoothing capacitor 14. The first switching circuit 16 and the second switching circuit 18 are controlled by signals output from the first drive circuit 46 and the second drive circuit 48 under control of the control circuit 44. That is, the ON/OFF controls of the pair of first switching element 40 and 40 and the pair of second switching element 42 and 42 are carried out at predetermined timings, respectively; so that a high-frequency current is supplied to the first resonant circuit 20 via the first switching circuit 16, and a high-frequency current is supplied to the second resonant circuit 22 via the second switching circuit 18. When the high-frequency current is supplied to the first resonant circuit 20, i.e., the basic coil 28 and the first coil 30, a magnetic flux will is generated in the coils 28, 30. When the high-frequency current is supplied to the second resonant circuit 22, i.e., the basic coil 28 and the second coil 32, a magnetic flux is generated in the coils 28, 32. Although the combined current of the high-frequency currents which flow through the first coil 30 and the second coil 32 connected in series flows into the basic coil 28, a temperature rise of the basic coil 28 can be reduced since the number of the strands of the litz wire of the basic coil 28 is set larger than the numbers of the strands of the first coil 30 and the second coil 32.

In the state where the to-be-heated object 38 is magnetically coupled to all of the three coils 28, 30, 32 that constitute the work coil 26 (refer to FIG. 3), when the to-be-heated object 38 is placed on the top plate, the magnetic flux generated in each coil 28, 30, 32 causes an induced current to flow into the to-be-heated object 38 to heat the to-be-heated object 38. Since the first coil 30 and the second coil 32, which are connected in series to the basic coil 28, are connected in parallel, it is possible to suppress a significant change in the magnetic flux in the diameteric direction of the work coil, unlike in the case of forming the work coil with a single coil according to the related art. As a result, the distribution of the induced current generated in the to-be-heated object 38 can be made approximately uniform in the diameteric direction, so that the whole to-be-heated object 38 is heated uniformly.

The impedance of the to-be-heated object 38 to each coil 28, 30, 32 changes depending on the good/poor state (short/long distance between the coil and the to-be-heated object) of magnetic connection of the to-be-heated object 38 to each coil 28, 30, 32. That is, the impedance becomes large in the good state of magnetic connection, but becomes small in the poor state of magnetic connection. With the three coils 28, 30, 32 formed not to be completely independent of one another as in the embodiment, the load applied to the switching circuit 16, 18 changes according to a change in the impedance of the to-be-heated object 38 to each coil 28, 30, 32, so that the value of the high-frequency current supplied to the resonant circuit 20, 22 via the respective switching circuit 16, 18 is automatically changed according to the value of the impedance. Therefore, it is unnecessary to provide means for detecting the state of magnetic connection to the to-be-heated object 38 (position of the to-be-heated object 38 to the coil 28, 30, 32) for each coil 28, 30, 32 to adjust the size of the high-frequency current according to the state of the magnetic connection detected by the detection means, so that the detection means and the means for adjusting the high-frequency current can be omitted, thereby simplifying the configuration.

The ratio of the inductances of the basic coil 28 and the first coil 30 and the ratio of the inductances of the basic coil 28 and the second coil 32 are both set in the range of 1:3 to 1:4. Therefore, the aforementioned change in impedance is proportional to the value of the high-frequency current supplied to each coil 28, 30, 32, thus achieving the proper balance adjustment. In addition, since the difference between the first total inductance of the basic coil 28 and the first coil 30, and the second total inductance of the basic coil 28 and the second coil 32 is set to lie within 20%, occurrence of noise and vibration (pan noise) can be suppressed by supplying high-frequency currents of the same frequency to the individual coils 28, 30, 32.

If the winding directions of the three coils 28, 30, 32 which constitute the work coil 26 are opposite to one another (for example, the basic coil 28 and the second coil are wound clockwise, and the first coil 30 is wound counterclockwise), an excess current may flow into each switching circuit 16, 18 by mutual induction. Since the winding directions of the three coils 28, 30, 32 which constitute the work coil 26 according to the embodiment are the same, however, it is possible to prevent the mutual-induction originated flow of an excess current into each switching circuit 16, 18. Therefore, it is unnecessary to use a switching element of high rated current and high rated voltage as the switching element 40, 42 constituting the switching circuit 16, 18, thus making it possible to reduce the cost and suppress the ratio of occurrence of failures low.

Figure 4:
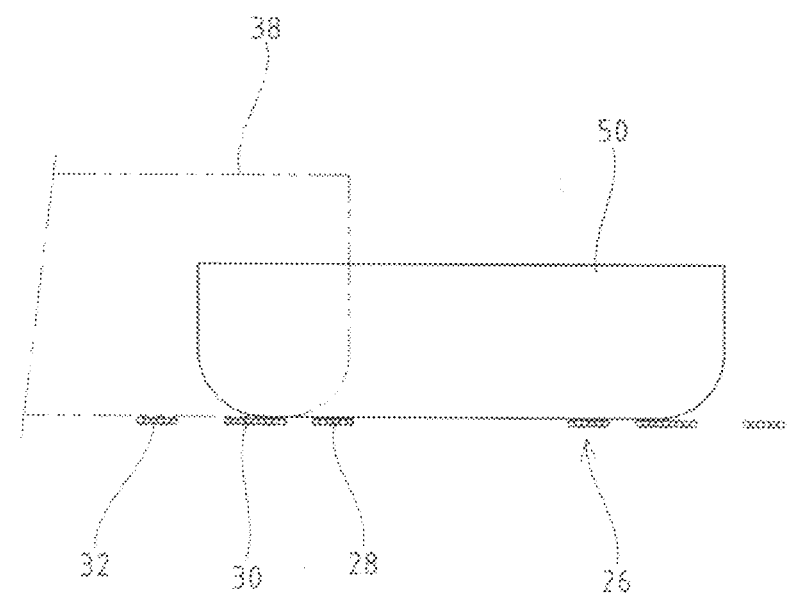
FIG. 4 An explanatory diagram showing a state where the position of the object to be heated is changed with respect to the work coil according to the embodiment, and the relation between a small object to be heated and the work coil.

Next, in the state where the position of the to-be-heated object 38 shifts relative to the work coil 26, and, as indicated by the long dashed and double-short dashed line in FIG. 4, the to-be-heated object 38 faces the position where it is not magnetically coupled to the basic coil 28, the basic coil 28 becomes loadless. Since the basic coil 28 is connected to the first coil 30 and the second coil 32 in series, however, the to-be-heated object 38 which is magnetically connected to the first coil 30 and the second coil 32 serves as a load to the basic coil 28, so that an excess current does not flow into either of the first switching circuit 16 and the second switching circuit 18, thus preventing each switching element 40, 42 from failing. In case of heating a small object 50 to be heated smaller than the outer diameter of the first coil 30, the small to-be-heated object 50 is not magnetically connected to the second coil 32 as indicated by the solid line in FIG. 4. Since the small to-be-heated object 50 is magnetically connected to the basic coil 28 connected in series to the second coil 32 in this case, an excess current does not flow into the second switching circuit 18, thus preventing the switching element 42 from failing. That is, it is possible to achieve safe and efficient heating regardless of the size or position shift of the to-be-heated object 38, 50. In addition, it is unnecessary to detect the position of the to-be-heated object 38, 50 in relative to each coil 28, 30, 32, and to enable/disable power supply according to the presence of the load, thus simplifying the control system.

Since an excess current can be prevented from flowing into each switching circuit 16, 18, a switching element of low rated current and low rated voltage can be used as the switching element 40, 42 constituting the switching circuit 16, 18. That is, it is possible to reduce the manufacturing cost and suppress the ratio of occurrence of failures of the switching element 40, 42 itself low.

According to the embodiment, the first coil 30 and the second coil 32 are connected in series to the basic coil 28, so that it is sufficient to connect two switching circuits to the first coil 30 and the second coil 32, and it is unnecessary to provide a switching circuit for every one of the coils 28, 30, 32.

MODIFICATIONS

The present invention is not limited to the foregoing configuration of the embodiment, and can adopt other configurations as needed.

1. Although three coils are used in the embodiment, four or more coils may be provided, and the other coils than the basic coil may each be connected in series to the basic coil, and may be connected to one another in parallel.

2. Although the basic coil is arranged at the innermost position in the embodiment, the basic coil is not restrictive to this layout position, and may be arranged at the intermediate position or the outermost position.

3. The power supply for an electromagnetic range is not limited to a three-phase AC power supply of 200 V, and may be selected from three-phase AC power supplies of 200 to 240 V according to the location where the electromagnetic range is used, or may be a single-phase commercially available AC power supply (frequency of 50 Hz or 60 Hz) of 100 to 120 V or 200 to 240 V.

4. Although the description of the embodiment has been given of the case where each resonant circuit is provided with a dedicated resonant capacitor, it is possible to employ a configuration where a single resonant capacitor is arranged at a position closer to the basic coil between the basic coil and the nodes of the wiring extending on both of the right and left sides of the basic coil with the other wirings in the circuit diagram of FIG. 1, so that the single resonance capacitor is commonly used as the resonance capacitors of the individual resonance circuits.

The invention claimed is:

1. An electromagnetic induction heating device provided with a resonant circuit having an induction heating coil (26) which heats an object to be heated (38), and a switching circuit which supplies a high-frequency current to the resonant circuit, characterized in that the induction heating coil (26) includes a plurality of first coils (30, 32) connected in parallel to one another, and a second coil (28) connected in series to each of the first coils (30, 32), and the individual coils (28, 30, 32) are arranged substantially concentric on a substantially same plane, the resonant circuit is divided with each of the first coils (30, 32) and the second coil (28) as a set, and the independent switching circuits (16, 18) are connected to the respective resonant circuits (20, 22).

2. The electromagnetic induction heating device according to claim 1, wherein all of the coils (28, 30, 32) are wound in a same winding direction.

3. The electromagnetic induction heating device according to claim 1, wherein each of the coils (28, 30, 32) is formed by a litz wire wound spirally, and a number of strands of the litz wire of the second coil (28) is set greater than a number of strands of the litz wire of the first coil (30, 32).

4. The electromagnetic induction heating device according to claim 1, wherein a ratio of an inductance of the second coil (28) to an inductance of the first coil (30, 32) is set between 1:3 and 1:4.

5. The electromagnetic induction heating device according to claim 4, wherein a difference between a total inductance of the second coil (28) and a first coil (30) which are connected in series, and a total inductance of the second coil (28) and another first coil (32) which are connected in series is set to 20% or less.

* * * * *